United States Patent
Yamada et al.

(10) Patent No.: US 6,746,799 B2
(45) Date of Patent: Jun. 8, 2004

(54) LITHIUM PHOSPHATE COMPOSITE POSITIVE ELECTRODE AND NON-AQUEOUS ELECTROLYTE CELL

(75) Inventors: Atsuo Yamada, Kanagawa (JP); Takayuki Yamahira, Fukushima (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 09/842,485

(22) Filed: Apr. 25, 2001

(65) Prior Publication Data

US 2002/0004169 A1 Jan. 10, 2002

(30) Foreign Application Priority Data

Apr. 25, 2000 (JP) .................................... P2000-128998

(51) Int. Cl.⁷ ............................ H01M 4/48; H01M 4/58
(52) U.S. Cl. ................... 429/221; 429/218.1; 429/231.1
(58) Field of Search ................... 429/218.1, 231.1, 429/221

(56) References Cited

U.S. PATENT DOCUMENTS 5,910,382 A * 6/1999 Goodenough et al. ... 429/218.1
6,007,947 A * 12/1999 Mayer ..................... 429/231.1

* cited by examiner

Primary Examiner—Mark Ruthkosky
(74) Attorney, Agent, or Firm—Sonnenschein, Nath & Rosenthal LLP

(57) ABSTRACT

A lithium ion cell less costly than a control lithium ion cell is provided. The lithium ion cell is improved appreciably in operational stability under special conditions, such as high temperatures, and exhibits superior characteristics against over-discharging, while guaranteeing compatibility to the operating voltage of a conventional lithium ion cell and an energy density equivalent to that of the conventional lithium ion cell. To this end, the lithium ion cell includes a positive electrode, a negative electrode and a non-aqueous electrolyte, and uses, as a positive electrode active material, a composite material of a first lithium compound represented by the general formula $Li_xM_yPO_4$, where $0<x<2$, $0.8<y<1.2$ and M contains Fe, and a second lithium compound having a potential holder than the potential of the first lithium compound.

26 Claims, 13 Drawing Sheets

LITHIUM PHOSPHATE COMPOSITE POSITIVE ELECTRODE AND NON-AQUEOUS ELECTROLYTE CELL

RELATED APPLICATION DATA

The present application claims priority to Japanese Application No. P2000-128998 filed Apr. 25, 2000, which application is incorporated herein by reference to the extent permitted by law.

BACKGROUND OF THE INVENTION

This invention relates to a positive electrode and a non-aqueous electrolyte cell employing a lithium compound oxide as a positive electrode active material.

Recently, electronic equipment, such as video cameras or headphone type stereo devices, are being rapidly improved in performance and reduced in size, so that an increasing demand is raised towards a higher capacity of the secondary cell as a power source of these electronic equipment. As the secondary cells, lead secondary cells, nickel-cadmium secondary cells and nickel hydrogen cells have so far been used. A non-aqueous electrolyte secondary cell, employing a carbonaceous material and a lithium cobalt oxide ($LiCoO_2$) as negative electrode active material and positive electrode active material, respectively, resorts to doping/undoping of lithium to suppress dendritic growth or pulverization of lithium, thus achieving superior cyclic useful life as well as a high energy density and a high capacity. As the positive electrode active material for this lithium secondary cell, $LiNiO_2$ having the same spatial group R3m/layered structure as that of $LiCoO_2$ and $LiMn_2O_4$ having the normal spinel structure and the spatial group Fd3m, have been put to practical use besides $LiCoO_2$.

However, the lithium ion secondary cell, employing the above-mentioned positive electrode active material, is more costly than the conventional secondary cell, mainly due to the cost involved in the positive electrode active material. Since this is ascribable to the fact that transition metals, as constituent elements, are rare. It is therefore desirable to use a material which is based on more abundant and inexpensive elements, such as iron.

On the other hand, the conventional positive electrode active material is problematic in general in operational stability. This is caused by high voltage and consequent high reactivity with the electrolytic solution and by instabilities in the crystalline structure. Thus, it is a frequent occurrence that sufficient stability is not displayed in high-temperature cyclic characteristics, storage characteristics or in self-discharge performance.

The present inventors were the first to win success with an iron compound in controlling various physical properties required of the positive electrode for the lithium cell, and in realizing the energy density equivalent to that of the conventional material, such as $LiCoO_2$, $LiNiO_2$ or $LiMn_2O_4$, through optimization of the synthesis process of an iron-based material $LiFePO_4$ Moreover, as a result of our eager researches, the present inventors have found that this material is an ideal material, insofar as cost and stability are concerned, in that the material is excellent in high temperature stability, and in that it is substantially free from cyclic or storage deterioration or self-discharge even at elevated temperatures of 80° C.

However, the cell displays extremely flat charging/discharging characteristics at a generated voltage of 3.4V. The cell has a somewhat low voltage and different charging/discharging curve, in comparison with the moderate charging/discharging characteristics from 4.0 to 3.5V of conventional materials, such that $LiFePO_4$, if used alone, cannot be made compatible with widely used lithium ion secondary cell.

The conventional lithium ion secondary cell suffers not only from the above-mentioned cost and operational stability, but also from the drawback that, if overcharged, charging/discharging characteristics are deteriorated. That is, if the cell is open-circuited when an electronic equipment employing the cell falls into disorder or if a cut-off voltage is not set in the electronic equipment, with the discharging voltage being 0V, the open-circuit voltage is not restored, such that, if the cell is subsequently charged or discharged, the cell capacity is lowered appreciably. The charging/discharging characteristics of the secondary cell in case it has been over-discharged to 0V are crucial for practical use of the secondary cell, such that measures against deterioration of the charging/discharging characteristics are indispensable.

The reason for deterioration in over-discharging and short useful life is that the potential of copper as the negative electrode current collector is pulled during the terminal process of the over-discharging by the operating potential of the positive electrode which is as high as 3.5 V to exceed the voltage of precipitation dissolution of copper of 3.45V, thus inducing the dissolution reaction of copper, as described in JP Patent No. 2797390.

SUMMARY OF THE INVENTION

The present invention has been proposed with the above-described status of the prior art in mind. Thus, it is an object of the present invention to provide a positive electrode with which it is possible to assure compatibility of a cell employing the positive electrode with a conventional lithium ion cell, an energy density of the cell equivalent to that of the conventional lithium ion cell, an appreciably improved operational stability under special conditions, such as elevated temperatures, and superior performance against over-discharging, as well as to construct a lithium ion cell less costly than the conventional lithium ion cell. It is another object of the present invention to provide a non-aqueous electrolyte cell employing the positive electrode.

A positive electrode according to the present invention includes a layer of a positive electrode active material is formed on a positive electrode current collector, and wherein the layer of the positive electrode active material contains, as a positive electrode active material, a composite product of a first lithium compound represented by the general formula $Li_xM_yPO_4$, where $0<x<2$, $0.8<y<1.2$ and M contains Fe, and a second lithium compound having a potential holder than the potential of the first lithium compound.

The positive electrode according to the present invention uses the composite material comprised of the first lithium compound and the second lithium compound, as the positive electrode active material, so that, during charging/discharging, reaction takes place continuously between the first and second lithium compounds. If this positive electrode is used as the cell, it becomes possible to suppress discontinuous voltage changes during over-charging and charging/discharging to a minimum to assure stable charging/discharging characteristics.

A non-aqueous electrolyte cell according to the present invention includes a positive electrode including a positive electrode current collector carrying a layer of a positive electrode active material thereon, a negative electrode including a negative electrode active material carrying a layer of a negative electrode active material thereon and a non-aqueous electrolyte interposed between the positive electrode and the negative electrode, wherein the layer of the positive electrode active material contains, as a positive electrode active material, a composite product of a first lithium compound represented by the general formula $Li_xM_yPO_4$, where $0<x<2$, $0.8<y<1.2$ and M contains Fe, and a second lithium compound having a potential holder than the potential of the first lithium compound.

The positive non-aqueous electrolyte cell according to the present invention uses the composite material comprised of the first lithium compound and the second lithium compound, as the positive electrode active material, so that, during charging/discharging, reaction takes place continuously between the first and second lithium compounds. So, it becomes possible to suppress discontinuous voltage changes during over-charging and charging/discharging to a minimum to assure stable charging/discharging characteristics.

According to the present invention, a non-aqueous electrolyte cell having superior charging/discharging characteristics and cyclic characteristics may be realized by employing a compound system comprised of the first and second lithium compounds having respective different potentials.

DESCRIPTION OF THE PREFERRED EMBODIMENTS

The present invention is now explained with reference to certain preferred embodiments thereof.

Figure 1:
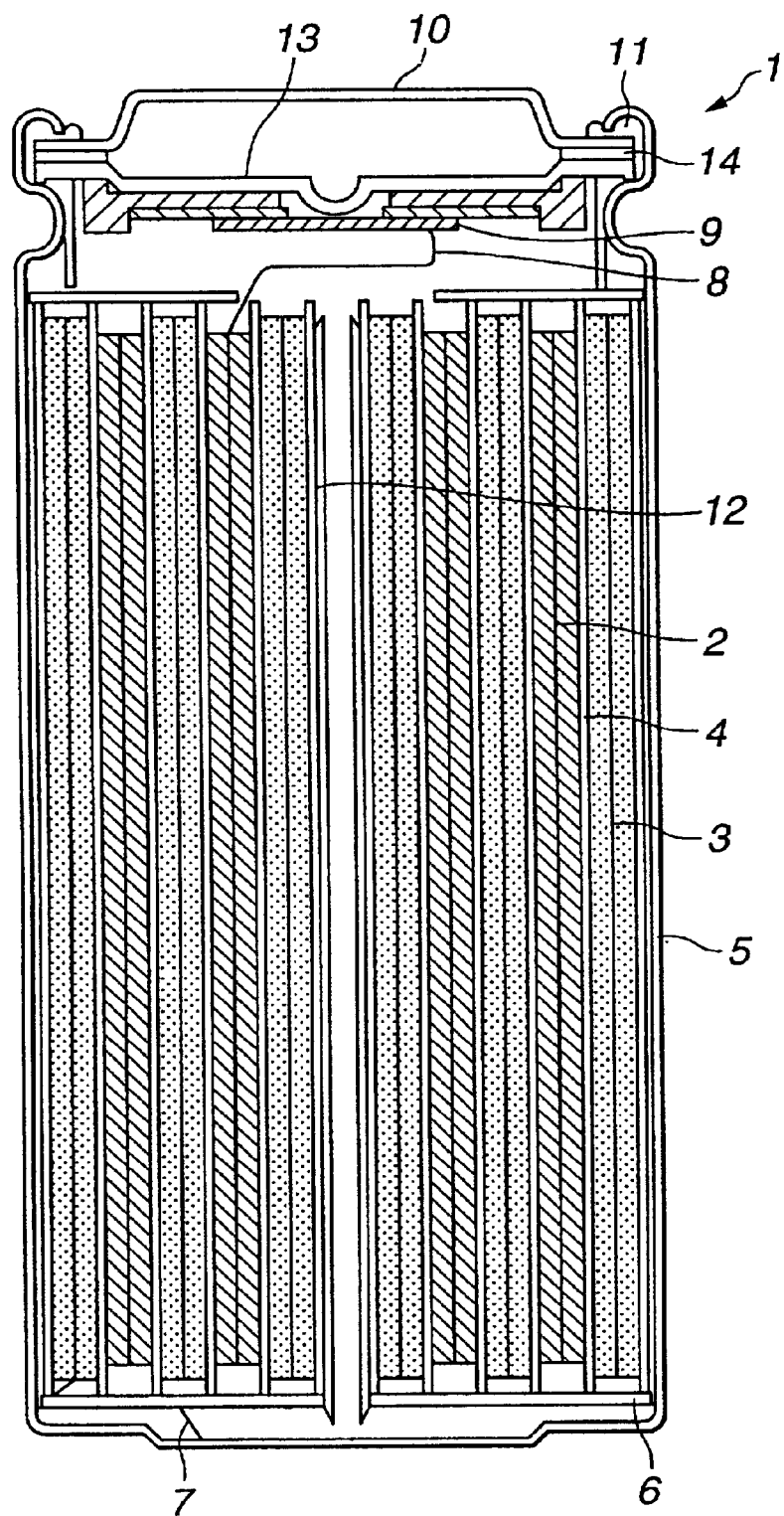
FIG. 1 is a longitudinal cross-sectional view showing an illustrative structure of a non-aqueous electrolyte cell according to the present invention.

FIG. 1 is a longitudinal cross-sectional view showing an illustrative structure of a non-aqueous electrolyte cell according to the present invention. This non-aqueous electrolyte cell 1 includes a coiled product, comprised of a strip-like positive electrode 2, a strip-like negative electrode 3, coiled in tight contact with each other with a separator 4 in-between, with the resulting coiled product being loaded in a cell can 5.

The positive electrode 2 is prepared by coating a positive electrode mixture, containing a positive electrode active material and a binder, on a current collector and drying the so-coated mixture in situ. The current collector may, for example, be a metal foil, such as an aluminum foil.

The non-aqueous electrolyte cell 1 of the present invention uses, as a positive electrode active material, a compound mass of a first lithium compound and a second lithium compound. The first lithium compound, represented by the general formula $Li_xM_yPO_4$, where x is such that $0<x<2$, y is such that $0.8<y<1.2$ and M includes Fe, has a potential holder than 3.45 which is the oxidation potential of copper used extensively for a negative electrode current collector, whilst the second lithium compound is comprised mainly of known $LiCoO_2$, $LiNiO_2$ or $LiMn_2O_4$ and has a potential nobler than 3.45V. The first lithium compound may preferably be $LiFePO_4$ or $LiFe_zMn_{1-z}PO_4$ where $0<z<1$, only by way of examples.

By constructing the positive electrode active material by the first lithium compound, having a potential holder than 3.45V, and the second lithium compound, having a potential nobler than 3.45V, lithium is extracted during charging from the first lithium compound in the vicinity of 3.4V and subsequently lithium is extracted from the second lithium compound in the vicinity of 3.4 to 4.2V.

By constructing the positive electrode active material from the first lithium compound having the potential holder than 3.45 V which is the oxidation potential of copper widely used for the negative electrode current collector, and from the second lithium compound having the potential nobler than 3.45V, lithium is undoped from both the first and second lithium compounds so as to be furnished to the negative electrode. So, with this non-aqueous electrolyte cell 1, the amount of lithium doped to the negative electrode is the sum of the lithium capacities of the first and second lithium compounds.

Conversely, during discharging, the second lithium compound in the positive electrode dopes lithium by way of discharging in the vicinity of 4.2 to 3.4 V. Then, at 3.4V and lower, the first lithium compound dopes lithium by way of discharging.

So, the amount of lithium of the negative electrode is not depleted even when the second lithium compound has discharged substantially completely. The first lithium compound then is discharged. Since the potential of the first lithium compound is holder at this time than the oxidation potential of the negative electrode current collector, the negative electrode current collector itself does not act like a negative electrode active material. So, the negative electrode current collector does not constitute a cell between it and the positive electrode active material, so that there is no risk of dissolution of the negative electrode current collector.

In the non-aqueous electrolyte cell 1 of the present invention, since the potential generated by the first lithium compound during charging/discharging as described above is close to that generated by the second lithium compound, discontinuous voltage changes during charging/discharging can be suppressed to a minimum even if the electrode is a composite electrode composed of the first and second lithium compounds thus realizing a smooth charging/discharging curve. Moreover, a charging/discharging curve similar in profile to one for the case of using the first positive electrode active material alone may be realized.

Thus, the non-aqueous electrolyte cell 1 may be operated in substantially the same voltage range as when the second lithium compound, that is the lithium compound, such as $LiCoO_2$, $LiNiO_2$ or $LiMn_2O_4$ routinely used as the positive electrode active material, is used alone, thus achieving the compatibility. Moreover, the lithium compound, essentially based on $LiFePO_4$ more stable chemically and less costly than the conventional lithium compound, is compounded, thus allowing to construct a cell system appreciably improved in stability and cost. Specifically, the non-aqueous electrolyte cell 1 of the present invention is superior in charging/discharging characteristics and in cyclic characteristics.

In addition, since the potential generated by the first lithium compound and the potential generated by the second lithium compound are close to each other, with the copper oxidation potential of 3.45 V in-between, discontinuous voltage changes during the charging/discharging, otherwise caused by using the compounded electrode of the first and second lithium compounds, may be suppressed to a minimum to achieve a smooth charging/discharging curve. Moreover, according to the present invention, since the energy density of the first lithium compound $LiFePO_4$ and that of the second lithium compound comprised basically of routinely used $LiCoO_2$, $LiNiO_2$ and $LiMn_2O_4$, the aforementioned various added values can be afforded as the high energy density in a sum total is maintained.

Moreover, in the present non-aqueous electrolyte cell 1, there may be mixed a compound(s) other than the aforementioned first and second lithium compounds, in order to constitute the positive electrode active material.

As the binder of the positive electrode active material, any suitable known binder(s) routinely used for the positive electrode mixture of the cell may be used. In addition, any suitable known additive(s), such as electrification agent(s), maybe added to the positive electrode mixture.

The negative electrode 3 is prepared by coating a negative electrode mixture, containing a negative electrode active material capable of doping/undoping lithium, and a binder, on the negative electrode current collector, and drying the negative electrode mixture thus coated in situ. As the negative electrode current collector, a foil of metal that cannot be alloyed with lithium may be used. In particular, a copper foil or a nickel foil is preferred. Also, a metal foil plated with copper or nickel may be used.

As the negative electrode active material, a carbonaceous material or an alloy material, not containing lithium and having a large capacity for lithium (the potential lithium doping quantity) is used. As the carbonaceous material, carbon materials, such as pyrocarbons, cokes, graphites, vitreous carbon fibers, sintered organic high molecular compounds, carbon fibers or activated charcoal, capable of doping/undoping lithium, may be used. The cokes may be exemplified by pitch coke, needle coke and petroleum coke. The sintered organic high molecular compounds mean phenolic or furan resins carbonified on firing at a suitable temperature.

The aforementioned alloy material means a compound represented by the chemical formula $M_xM'_yLi_z$ where M is a metal element that can be alloyed with lithium, M' is an element Li and one or more metal element other than the element M, x is a number larger than 0, and y, z are numbers not less than 0. The semiconductor elements, namely B, Si and As, are also comprehended in the metal element. Examples of the alloy materials include metals, such as Mg, B, Al, Ga, In, Si, Sn, Pb, Sb, Bi, Cd, Ag, Zn, Hf, Zr, and Y, alloys thereof, Li—Al, Li—Al—M, M being one or more of the group 2A, 3B or 4B transition metal elements, AlSb, and CuMgSb.

As the elements that can be alloyed with lithium, preferably typical elements of the group 3B, more preferably Si or Sn, and most preferably Si, may be used. More specifically, compounds represented by $M_xSi$ or $M_xMn$, where M denotes one or more metal element excluding Si or Sn, are used. Specified examples of the elements include $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$ $FeSi_2$, $MnSi_2$, $NbSi_2$, $TaSi_2$, $VSi_2$, $WSi_2$, and $ZnSi_2$.

Moreover, metal elements other than the group 4B elements, including one or more non-metallic elements, and excluding carbon, may be contained in the negative electrode active material. Examples of these negative electrode active materials include SiC, $Si_3N_4$, $Si_2N_2O$, $Ge_2N_2O$, $SiO_x$, where $0<x\leq2$, $SnO_x$, where $0<x\leq2$, $SnO_x$, where $0<x\leq2$, LiSiO and LiSnO.

Although there is no limitation to the method for the preparation of the negative electrode active material, a mechanical ironing method, or a method of mixing starting compounds and heating the resulting mixture in an inert atmosphere or a in reducing atmosphere, may be used. Two or more of the above-mentioned materials may be mixed in the negative electrode active material. These materials may be doped electro-chemically within the cell following the preparation of the cell. Alternatively, lithium may be supplied following or prior to cell preparation from a positive electrode or from a lithium source other than the positive electrode. The negative electrode active material may also be synthesized as the lithium containing material during synthesis of the material so as to be contained in the negative electrode during preparation of the cell.

As the binder contained in the layer of the negative electrode active material, any suitable resin material, routinely used as a binder of the layer of the negative electrode active material of this sort of the non-aqueous electrolyte cell, may be used. A foil of metal lithium, which proves a negative electrode active material, may also be used as a negative electrode active material.

The separator 4 is arranged between the positive electrode 2 and the negative electrode 3 to prevent shorting due to physical contact across the positive electrode 2 and the negative electrode 3. The separator 4 may be formed of any suitable known material routinely used for a separator of this sort of the non-aqueous electrolyte cell, such as a high-molecular film of e.g., polypropylene. The separator is preferably as thin in thickness as possible in view of the lithium ion conductivity and the energy density. For example, the separator is desirably not larger than 50 $\mu$m.

As the non-aqueous electrolytic solution, such a solution of an electrolyte dissolved in a non-protonic non-aqueous solvent may be used As the non-aqueous solvent, propylene carbonate, ethylene carbonate, butylene carbonate, vinylene carbonate, γ-butyl lactone, sulfolane, methyl sulfolane, 1,2-dimethoxyethane, 1,2-diethoxyethane, tetrahydrofuran, 2-methyl tetrahydrofuran, 1, 3-dioxorane, 4-methyl 1,3-dioxorane, methyl propionate, methyl butyrate, dimethyl carbonate, diethyl carbonate, dipropyl carbonate, diethylether, acetonitrile, propionitrile, anisole, acetic acid esters, lactic acid esters, and propionic acid esters, may be used. In particular, cyclic carbonates, such as propylene carbonate or vinylene carbonate, or chained carbonates, such as dimethyl carbonate, diethyl carbonate, dipropyl carbonate, may be used in view of voltage stability. These non-aqueous solvents may be used alone or as a mixture.

As the electrolyte, dissolved in the non-aqueous solvent, lithium salts, such as LiCl, LiBr, $LiPF_6$, $LiClO_4$, $LiAsF_6$, $LiBF_4$, $LiCH_3SO_3$, $LiCF_3SO_3$, $LiN(CF_3SO_2)_2$ or $LiB(C_6H_5)_4$, may be used. Of these lithium salts, $LiPF_6$ and $LiBF_4$ are most preferred.

In the non-aqueous electrolyte cell 1 according to the present invention, as described above, containing a compound system of the first and second lithium compounds, as the positive electrode active material, charging occurs in stability, while the over-discharging state may be suppressed to assure superior charging/discharging characteristics and cyclic characteristics.

The non-aqueous electrolyte cell 1, employing the compound system of the first and second lithium compounds, as the positive electrode active material, may, for example, be prepared in the following manner:

The positive electrode 2 is prepared by coating a positive electrode mixture, containing the positive electrode active material and the binder, on a metal foil, such as an aluminum foil, operating as a positive electrode current collector, and drying the entire assembly in situ to form the layer of the positive electrode active material. As the binder of the positive electrode mixture, any suitable known binder may be used. In addition, any suitable known additive may be added to the positive electrode mixture.

The negative electrode 3 may be prepared by uniformly coating the negative electrode mixture, containing the negative electrode active material and the binder, on a metal foil, such as copper foil, acting as a negative electrode current collector, and drying the assembly in situ to form a layer of the negative electrode active material. As the binder of the negative electrode mixture, any suitable known binder may be used. In addition, any suitable known additive may be added to the negative electrode mixture.

The positive electrode 2 and the negative electrode 3, obtained as described above, are tightly affixed together, with e.g., the separator 4 of a micro-porous polypropylene film in-between, with the resulting assembly being coiled spirally a number of times to form a coiled member.

The insulating plate 6 then is inserted on the bottom of an iron cell can 5, the inner surface of which is plated with nickel, and the coiled member is placed thereon. For current collection of the negative electrode, one end of a negative electrode lead 7, formed e.g., of nickel, is press-fitted to the negative electrode 3, with its other end being welded to the cell can 5. This electrically connects the cell can 5 to the negative electrode 3 so that the cell can 5 serves as an external negative electrode of the non-aqueous electrolyte cell 1. Also, for current collection of the positive electrode, one end of a positive electrode lead 8, formed e.g., of aluminum, is mounted on the positive electrode 2, with its other end being electrically connected to a cell lid 10 through a thin sheet for current interruption 9. This thin sheet for current interruption 9 breaks the current responsive to the internal pressure of the cell. This electrically connects the cell lid 10 to the positive electrode 2 so that the cell lid 10 serves as an external positive electrode of the non-aqueous electrolyte cell 1.

The inside of the cell can 5 then is charged with the non-aqueous electrolytic solution which is prepared by dissolving the electrolyte in the non-aqueous solvent.

The cell can 5 then is caulked through an insulating sealing gasket 11, coated with asphalt, to secure the cell lid 10 to complete the cylindrically-shaped non-aqueous electrolyte cell 1.

This non-aqueous electrolyte cell 1 is provided with a center pin 12, connected to the negative electrode lead 7 and to the positive electrode lead 8, a safety valve device 13 for exhausting the inner gas when the pressure in the cell is higher than a pre-set value, and with a PTC device 14 for preventing the temperature in the cell from increasing, as shown in FIG. 1.

Although the foregoing description has been made of the non-aqueous electrolyte cell 1, employing the non-aqueous electrolytic solution as the non-aqueous electrolyte cell, as an example, the non-aqueous electrolyte cell pertaining to the present invention is not limited to the above-described structure. For example, the present invention can be applied to the case of using the solid electrolyte or a gelated electrolyte containing a swelling solvent as the non-aqueous electrolyte.

The solid electrolyte used may be any of an inorganic solid electrolyte and a high molecular solid electrolyte, provided that the electrolyte is formed of a material exhibiting lithium ion conductivity. The inorganic solid electrolyte may be lithium nitride or lithium iodide. The high molecular solid electrolyte is composed of an electrolyte salt and a high molecular compound in which the electrolyte salt is dispersed. The high molecular solid electrolyte may be an etheric high molecular material, such as poly(ethylene oxide), cross-linked or not, a poly(methacrylate) ester based high molecular material or an acrylate-based high molecular material. The high molecular solid electrolyte may be used alone or as a copolymer or mixture.

The matrix used for a gellated solid electrolyte may be a variety of high molecular materials provided that the matrix is able to absorb and gelate the non-aqueous electrolytic solution. For example, fluorine-based high molecular materials, such as poly(vinylidene fluoride) or poly (vinylidene fluoride -co-hexafluoropropylene), etheric high molecular materials, such as poly(ethylene oxide), cross-linked or not, or poly(acrylonitrile), may be used. In particular, fluorine-based high molecular materials are preferably used in view of redox stability.

Although a secondary cell is taken as an example in the above-described embodiment, the present invention is not limited thereto, since it may also be applied to a primary cell. The cell of the present invention is not limited as to its shape, such that it may be cylindrical, square-shaped, coin-shaped or button-shaped. Moreover, it may be of any desired size, such that it may be of a thin type or a large-sized.

EXAMPLES

The present invention is hereinafter explained with reference to certain numerical examples intended for checking upon its effect. The present invention is, of course, not limited to these Examples.

First, samples of coin-shaped non-aqueous electrolytic solution secondary cells were prepared, as samples 1 to 5, using a mixture of the first lithium compound $LiFePO_4$ and the second lithium compound $LiCoO_2$, as a positive electrode active material, to check upon characteristics thereof.

Sample 1

First, the positive electrode active material was prepared as follows:

$LiFePO_4$, as the first lithium compound, was synthesized as follows: Iron acetate $Fe(CH_3CO_2)_2$, ammonium phosphate $NH_4H_2PO_4$ and lithium carbonate $Li_2CO_3$ were mixed sufficiently to a molar ratio of 2:2:1. The resulting mixture was directly calcined in a nitrogen atmosphere at 300° C. for 12 hours, and fired at 600° C. for 24 hours in a nitrogen atmosphere. By X-ray diffraction analyses, the produced powders were identified to be the single-phase $LiFePO_4$.

Then, $LiFePO_4$ produced and $LiCoO_2$ as the second lithium compound were mixed together at a weight ratio of 10:90 to give a mixture which then was used as a positive electrode active material.

Using the so-produced positive electrode active material, the positive electrode was prepared as now explained and, using the positive electrode, so prepared, a coin-type non-aqueous electrolytic solution secondary cell was prepared. 70 wt % of the dried positive electrode active material, 25 wt % of acetylene black, as an electrification agent, and 5 wt % of PVDF (Aldrich #1300), as a binder, were kneaded together, using DMF, to prepare a paste-like positive electrode mixture. This positive electrode mixture was coated on an aluminum mesh, operating as a positive electrode current collector, and the resulting assembly was compression-molded and dried at 100° C. for one hour in a dry argon stream to form a positive electrode pellet. Meanwhile, 60 mg of the positive electrode active material was carried by each positive electrode pellet.

A positive electrode pellet was accommodated in a positive electrode can, whilst lithium metal was accommodated in a negative electrode can. A separator was arranged between the negative and positive electrodes and a non-aqueous electrolytic solution was poured into the negative and positive electrode cans. The non-aqueous electrolytic solution was prepared by dissolving $LiPF_6$ in a solvent mixture comprised of equal volumes of propylene carbonate and dimethyl carbonate in a concentration of 1 mol/l.

Finally, the negative and positive electrode cans were caulked and secured together through an insulating gasket to complete a 2025 coin-shaped non-aqueous electrolyte secondary cell.

Sample 2

A positive electrode was prepared in the same way as in sample 1 except changing the weight ratio of the first lithium compound $LiFePO_4$ to the second lithium compound $LiCoO_2$ to 20:80 in producing the positive electrode active material. Using this positive electrode active material, a coin-shaped non-aqueous electrolytic solution secondary cell was produced.

Sample 3

A positive electrode was prepared in the same way as in sample 1 except changing the weight ratio of the first lithium compound $LiFePO_4$ to the second lithium compound $LiCoO_2$ to 30:70 in producing the positive electrode active material. Using this positive electrode active material, a coin-shaped non-aqueous electrolytic solution secondary cell was produced.

Sample 4

A positive electrode was prepared in the same way as in sample 1 except changing the weight ratio of the first lithium compound $LiFePO_4$ to the second lithium compound $LiCoO_2$ to 40:60 in producing the positive electrode active material. Using this positive electrode active material, a coin-shaped non-aqueous electrolytic solution secondary cell was produced.

Sample 5

A positive electrode was prepared, in the same way as in sample 1 except changing the weight ratio of the first lithium compound $LiFePO_4$ to the second lithium compound $LiCoO_2$ to 50:50 in producing the positive electrode active material. Using this positive electrode active material, a coin-shaped non-aqueous electrolytic solution secondary cell was produced.

A charging/discharging test was carried out on the samples 1 to 5 of the non-aqueous electrolytic solution secondary cell, prepared as described above.

The constant current charging was carried out up to 4.2V, which voltage was kept in carrying out the charging. The charging was terminated when the current was below 0.01 $mA/cm^2$. The discharging then was carried out and was terminated when the voltage fell to 2.0 V. For both charging and discharging, the ambient temperature (23° C.) was used, and the current density was set to 0.12 $mA/cm^2$.

Figure 2:
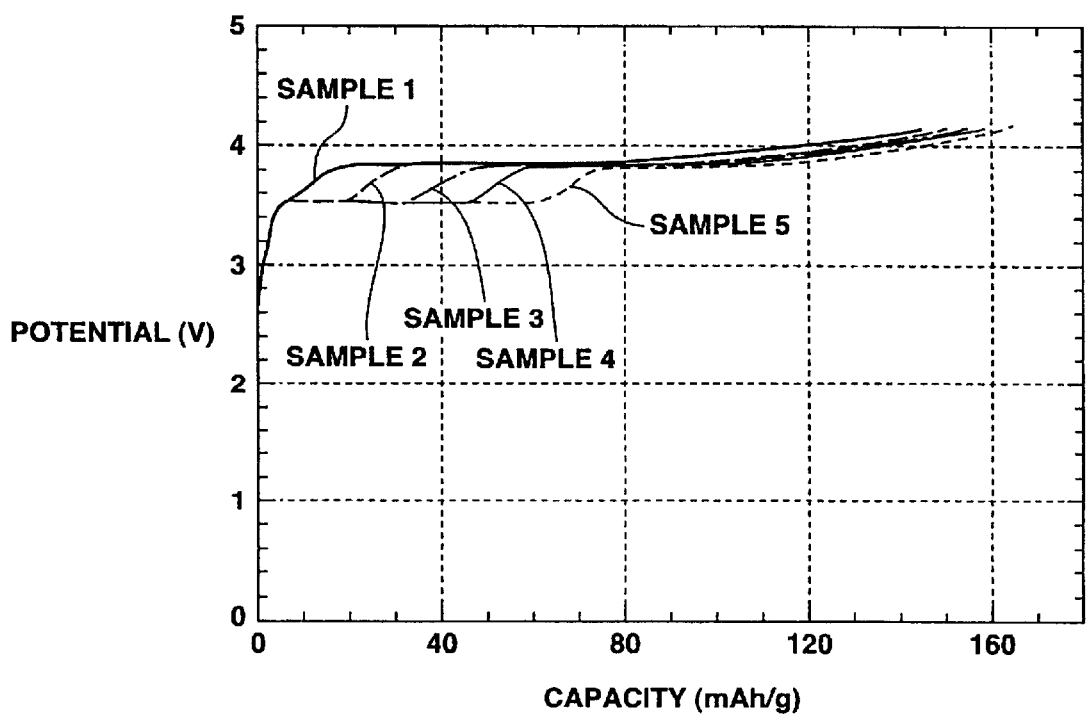
FIG. 2 shows charging curves of cells of samples 1 to 5.
Figure 3:
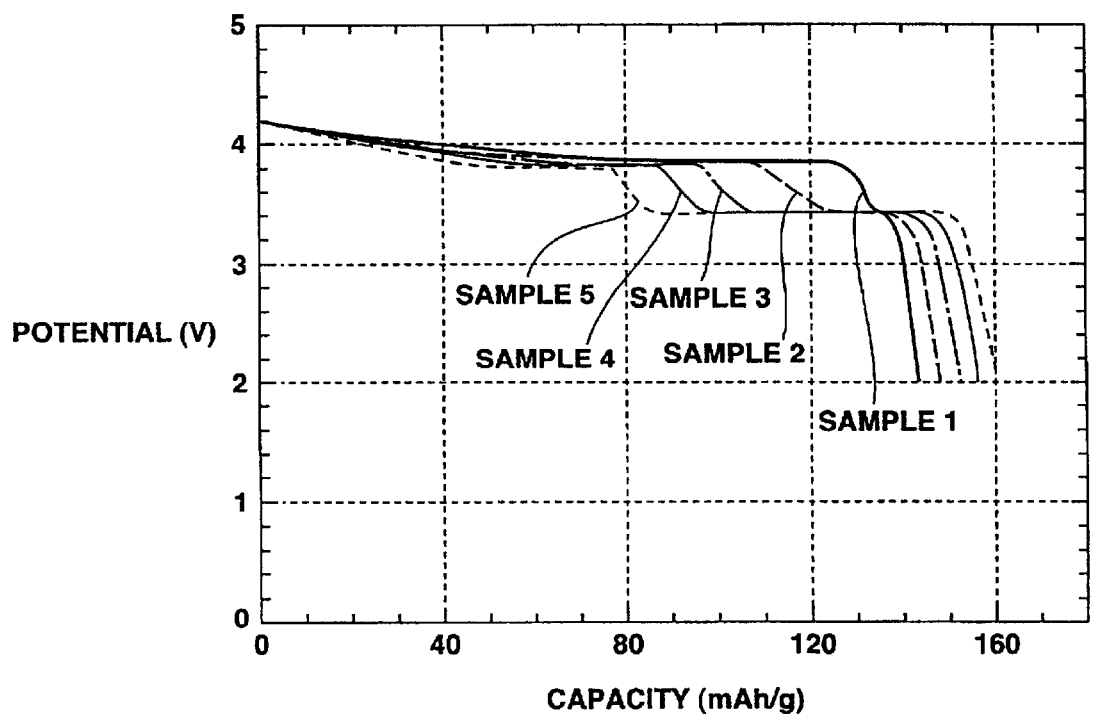
FIG. 3 shows discharging curves of cells of samples 1 to 5.

The charging curves for the samples 1 to 5 are shown in FIGS. 2 and the discharging curves for the same samples are shown in FIG. 3.

It is seen from FIG. 2 that a two-step shoulder appears in each charging curve, from which it is seen that, during charging, lithium is first extracted from the first lithium compound $LiFePO_4$ in an area in the vicinity of 3.8 to 4.2V and then extracted from the second lithium compound $LiCoO_2$ in an area in the vicinity of 3.8 to 4.2V.

It is likewise seen from FIG. 3 that a two-step shoulder appears in each discharging curve, from which it is seen that, during discharging, the second lithium compound $LiCoO_2$ is discharged as it dopes lithium in an area in the vicinity of 3.8 to 4.2V and then the first lithium compound $LiFePO_4$ is discharged as it dopes lithium in the vicinity of 3.4V.

It is also seen from FIGS. 2 and 3 that, as the $LiFePO_4$ mixing ratio is increased, the average voltage is slightly lowered, whilst the capacity is increased gradually.

The cells of the samples 1 to 5 were further charged to 4.2V and allowed to stand for one hour in an environment of 60° C. The discharging then was carried out to find the volume upkeep ratio, that is the ratio (%) of the capacity of the samples prior to allowing them to stand to that of the samples subsequent to allowing them to stand.

Figure 4:
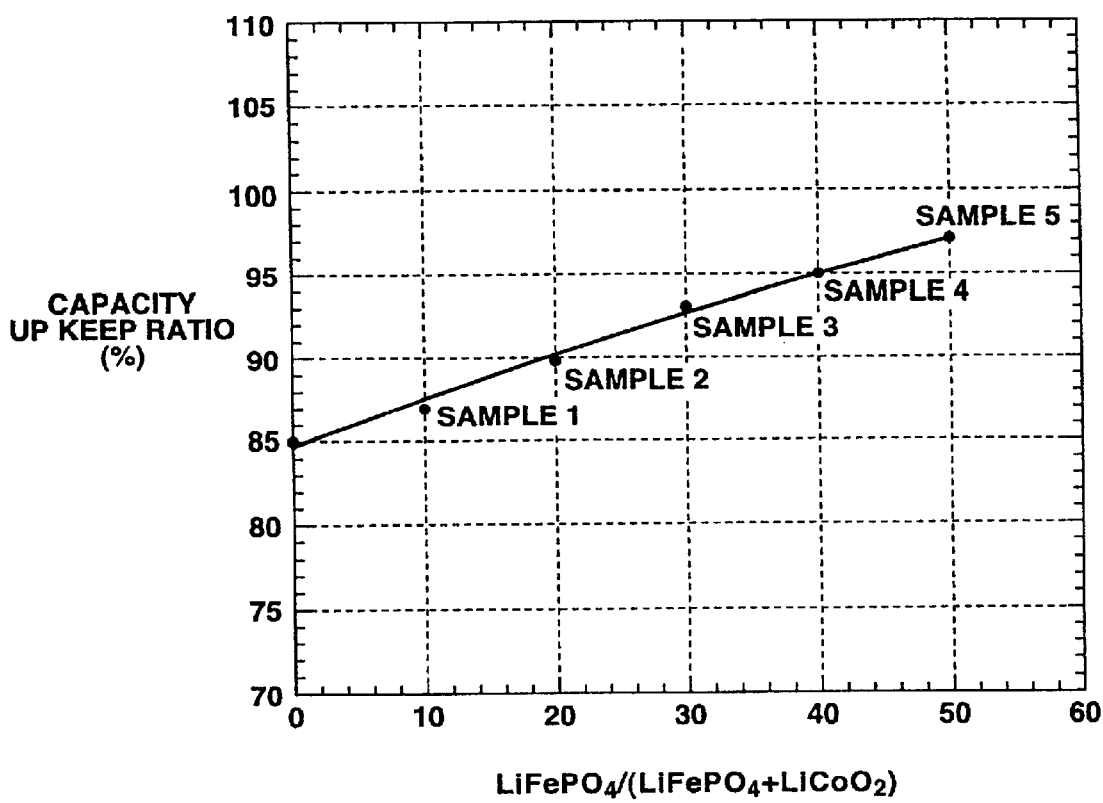
FIG. 4 shows the relation between the volume upkeep ratio and the proportion of the first lithium compound $LiFePO_4$ for the samples 1 to 5 of the cells.

FIG. 4 shows the results thus found in comparison with the proportion of the first lithium compound $LiFePO_4$ in the positive electrode active material. It is seen from FIG. 4 that, as the proportion of $LiFePO_4$ is increased, the volumetric upkeep ratio is improved, such that the high-temperature storage deterioration is suppressed appreciably.

Using a mixture of the second lithium compound $LiFePO_4$ and the second lithium compound $LiNi_{0.8}Co_{0.2}O_2$ as the positive electrode active material, samples of the coin-shaped non-aqueous electrolytic solution secondary cells were prepared as samples 6 to 10 to check upon characteristics thereof.

Sample 6

A positive electrode was prepared in the same way as in sample 1, except that $LiNi_{0.8}Co_{0.2}O_2$ was used as the second lithium compound in place of $LiCoO_2$ and that the first lithium compound $LiFePO_4$ and the second lithium compound $LiMn_{0.8}Mg_{0.2}O_2$ were mixed at a weight ratio of 10:90 so as to be used as the positive electrode active material. Using this positive electrode, a coin-shaped non-aqueous electrolytic solution secondary cell was prepared.

Sample 7

A positive electrode was prepared in the same way as the sample 6, except changing the weight ratio of the first lithium compound $LiFePO_4$ and the second lithium compound $LiMn_{0.8}Mg_{0.2}O_2$ to 20:80. Using the positive electrode active material, so prepared, a coin-shaped non-aqueous electrolytic solution secondary cell was prepared.

Sample 8

A positive electrode was prepared in the same way as the sample 6, except changing the weight ratio of the first lithium compound $LiFePO_4$ and the second lithium compound $LiMn_{0.8}Mg_{0.2}O_2$ to 30:70. Using the positive electrode active material, so prepared, a coin-shaped non-aqueous electrolytic solution secondary cell was prepared.
Sample 9

A positive electrode was prepared in the same way as the sample 6, except changing the weight ratio of the first lithium compound $LiFePO_4$ and the second lithium compound $LiMn_{0.8}Mg_{0.2}O_2$ to 40:60. Using the positive electrode active material, so prepared, a coin-shaped non-aqueous electrolytic solution secondary cell was prepared.
Sample 10

A positive electrode was prepared in the same way as the sample 6, except changing the weight ratio of the first lithium compound $LiFePO_4$ and the second lithium compound $LiMn_{0.8}Mg_{0.2}O_2$ to 50:50. Using the positive electrode active material, so prepared, a coin-shaped non-aqueous electrolytic solution secondary cell was prepared.

Figure 5:
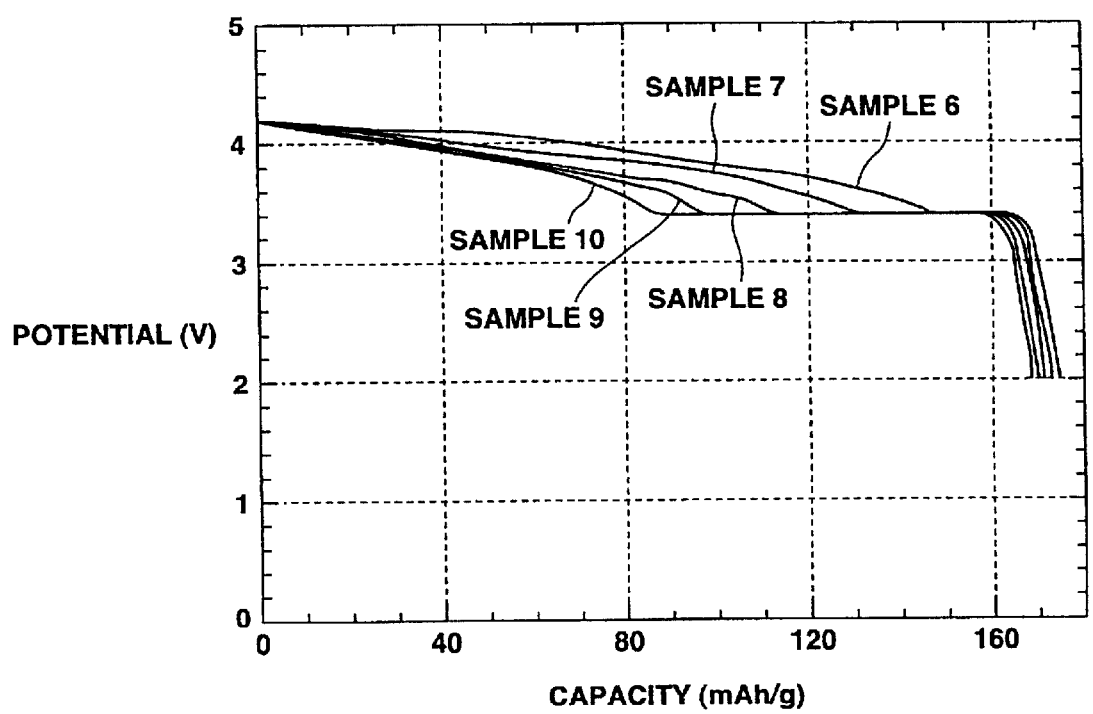
FIG. 5 shows discharging curves of cells of samples 6 to 10.

A charging/discharging test was carried out on the non-aqueous electrolytic solution secondary cells of the samples 6 to 10, prepared as described above, under the same conditions as described above. FIG. 5 shows a corresponding discharge curve.

It is seen from FIG. 5 that, during discharging, the second lithium compound $LiMn_{0.8}Mg_{0.2}O_2$ is discharged in an area in the vicinity of 3.5 to 4.2V, as it dopes lithium, with the first lithium compound $LiFePO_4$ being then discharged in the vicinity of 3.4V, as it dopes lithium. Since the operating voltages of the two compounds are close to each other, a smooth discharging curve is realized.

Figure 6:
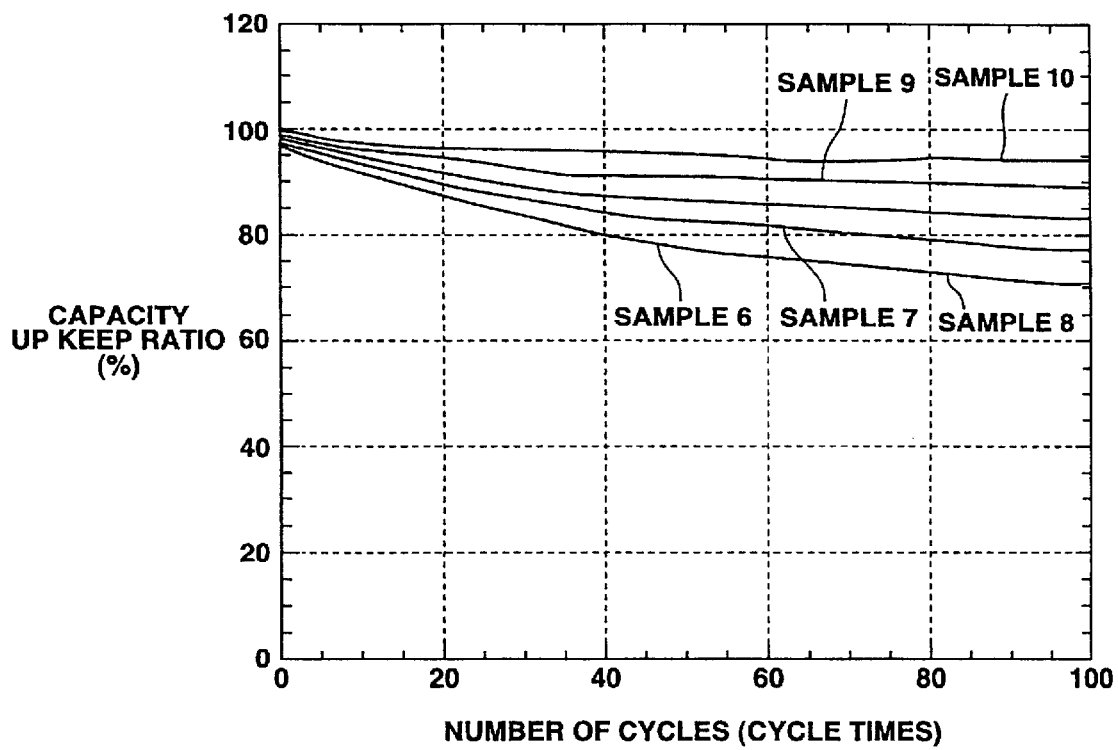
FIG. 6 shows the relation between the charging/discharging cycle and the volume upkeep ratio of the samples 6 to 10.

Of the non-aqueous electrolytic solution secondary cells of the samples 6 to 10, measurements were made of repetitive charging/discharging characteristics in the voltage range of 4.2 to 2.0V. The results are shown in FIG. 6, from which it is seen that, as the mixing ratio of the first lithium compound $LiFePO_4$ is increased, the cyclic characteristics are improved appreciably.

Using a mixture of the first lithium compound $LiFePO_4$ and the second lithium compound $LiCoO_2$ as the positive electrode active material, samples of the cylindrically-shaped non-aqueous electrolytic solution secondary cells were prepared to check upon characteristics thereof.
Sample 11

First, a positive electrode was prepared as follows:

The first lithium compound $LiFePO_4$ and the second lithium compound $LiCoO_2$ were mixed at a ratio of 10:90 to give a positive electrode active material.

91 parts by weight of the positive electrode active material, 6 parts by weight of graphite, as an electrification agent and 3 parts by weight of polyvinylidene fluoride, as a binder, were mixed together. 100 parts by weight of N-methyl pyrrolidone as a solvent were mixed to the resulting mixture to form a slurried mixture.

This positive electrode mixture was evenly coated on both surfaces of a strip-shaped aluminum foil, 20 μm in thickness, operating as a positive electrode current collector. The resulting product was dried and compression-molded by a roll press to form a strip-shaped positive electrode. In this strip-shaped positive electrode, the layer of the positive electrode active material was formed to substantially the same thickness on each surface of the positive electrode current collector.

The negative electrode was prepared as follows:

90 parts by weight of pulverized graphite as a negative electrode active material, and 10 parts by weight of polyvinylidene fluoride, as a binder, were mixed together. To the resulting mixture were added 100 parts by weight of N-methyl pyrrolidone, as a solvent, to form a slurried negative electrode mixture.

This negative electrode mixture was evenly coated on both surfaces of a strip-shaped copper foil, 10 μm in thickness, operating as a negative electrode current collector. The resulting product was dried and compression-molded by a roll press to form a strip-shaped positive electrode. In this strip-shaped positive electrode, the layer of the negative electrode active material was formed to substantially the same thickness on each surface of the negative electrode current collector.

The positive electrode, negative electrode and a pair of separators were layered together and coiled a number of times to form a coiled product. Specifically, the strip-shaped positive electrode, separators and the strip-shaped positive electrode were layered together in this order and the resulting layered product was coiled a number of times to give a hollow rod to form the coiled product.

An insulating plate then was inserted on the bottom of an iron cell can, the inner surface of which is plated with nickel, and the coiled product is placed thereon. For current collection of the negative electrode, one end of a negative electrode lead 7, formed e.g., of nickel, is press-fitted to the negative electrode 3, with its other end being welded to the cell can 5. For current collection of the positive electrode, one end of a positive electrode lead, formed e.g., of aluminum, was mounted on the positive electrode 2, with its other end being electrically connected to a cell lid 10 through a thin sheet used for current interruption. The inside of the cell can 5 then was charged with the non-aqueous electrolytic solution which was prepared at the outset by dissolving $LiPF_6$ in a solvent mixture of equal volumes of propylene carbonate and 1, 2-dimethoxyethane at a concentration of 1 mol/l.

The cell can 5 then was caulked through an insulating sealing gasket, coated with asphalt, to secure the cell lid to complete the cylindrically-shaped non-aqueous electrolyte cell 1 having an outer size of 20.5 mm and a height of 42 mm.
Sample 12

A positive electrode was prepared in the same way as sample 1, except changing the weight ratio of the first lithium compound $LiFePO_4$ and the second lithium compound $LiCoO_2$ in producing the positive electrode active material to 20:80 and, using this positive electrode, a cylindrically-shaped non-aqueous electrolyte cell was prepared.
Sample 13

A positive electrode was prepared in the same way as sample 1, except changing the weight ratio of the first lithium compound $LiFePO_4$ and the second lithium compound $LiCoO_2$ in producing the positive electrode active material to 30:70 and, using this positive electrode, a cylindrically-shaped non-aqueous electrolyte cell was prepared.
Sample 14

A positive electrode was prepared in the same way as sample 1, except changing the weight ratio of the first lithium compound $LiFePO_4$ and the second lithium compound $LiCoO_2$ in producing the positive electrode active material to 40:60 and, using this positive electrode, a cylindrically-shaped non-aqueous electrolyte cell was prepared.
Sample 15

A positive electrode was prepared in the same way as sample 1, except changing the weight ratio of the first lithium compound $LiFePO_4$ and the second lithium compound $LiCoO_2$ in producing the positive electrode active material to 50:50 and, using this positive electrode, a cylindrically-shaped non-aqueous electrolyte cell was prepared.

Sample 16

A positive electrode was prepared in the same way as in sample 1 except using only the second lithium compound $LiCoO_2$ in producing the positive electrode active material and, using this positive electrode, a cylindrically-shaped non-aqueous electrolyte cell was prepared.

Figure 7:
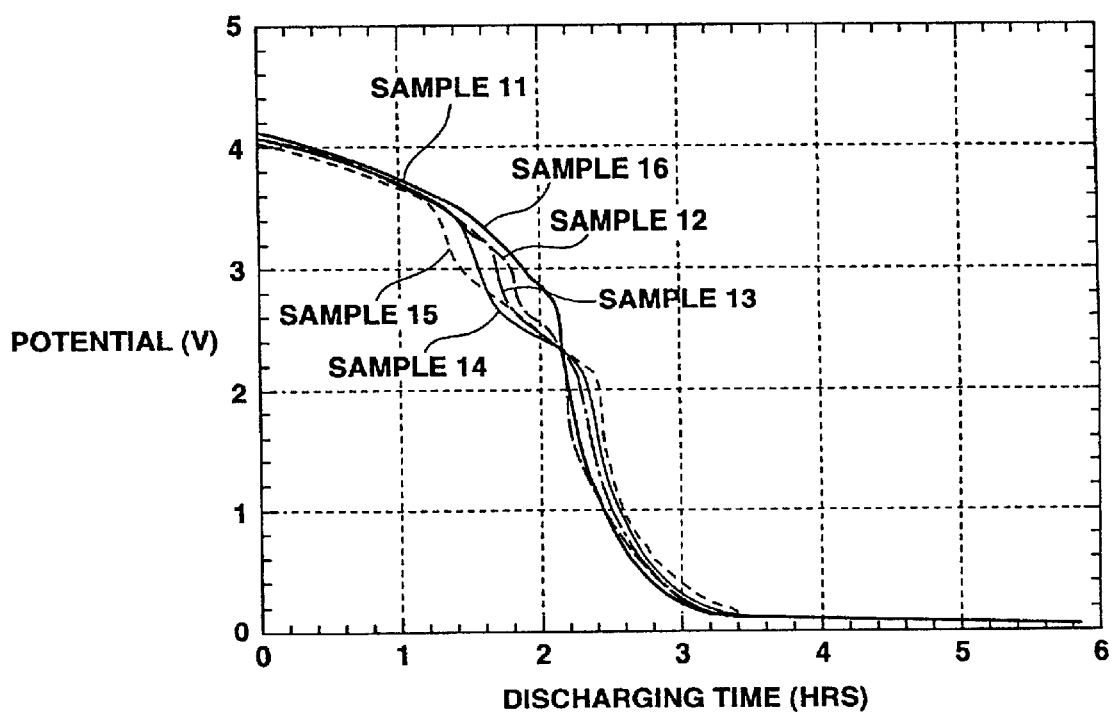
FIG. 7 shows discharging curves of cells of samples 11 to 16.

The non-aqueous electrolytic solution secondary cells of the samples 11 to 16, prepared as described above, were charged to 4.1V, at the constant current of 200 mA, and discharged to 0V with a load of 7.5Ω. FIG. 7 shows a corresponding discharging curve.

It is seen from FIG. 7 that the sample 11 of the non-aqueous electrolytic solution secondary cell, with the amount of addition of the first lithium compound $LiFePO_4$ of 10 wt %, has a discharging curve substantially analogous to one of the sample 16 of the non-aqueous electrolytic solution secondary cell employing only the second lithium compound $LiCoO_2$. However, if the amount of addition of the first lithium compound exceeds 20 wt %, a shoulder tends to be observed towards the end of the discharging period. It is also seen that the cell voltage of the totality of the non-aqueous electrolytic solution secondary cells becomes approximately equal to zero in about four hours thus indicating the state of overcharging.

The samples 11 to 16 of the non-aqueous electrolytic solution secondary cells were dismantled and checked. It was found that dissolution of the negative electrode current collector was observed in none of the samples 11 to 15 of the non-aqueous electrolytic solution secondary cells. On the other hand, part of the copper current collector was dissolved in the sample 16 of the non-aqueous electrolytic solution secondary cell employing only $LiCoO_2$ for the positive electrode, such that pits were formed in the copper current collector.

Figure 8:
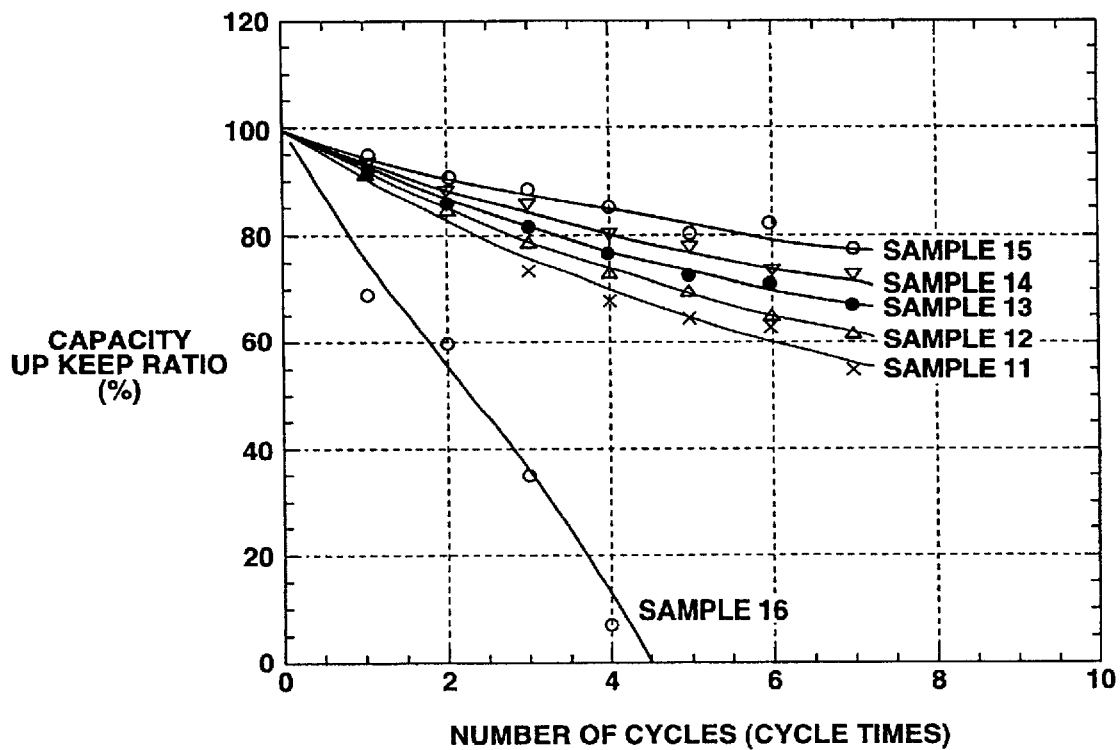
FIG. 8 shows the relation between the charging/discharging cycle and the volume upkeep ratio of the samples 11 to 16.

Moreover, the samples 11 to 16 of the non-aqueous electrolytic solution secondary cells were put to a cyclic test of charging the cells, and over-discharging the cells to 0V, under the same charging/discharging conditions as those of FIG. 7, and allowing the cells to stand for 24 hours, in a repetitive fashion. FIG. 8 shows the relation between the number of cycles and the discharge capacity upkeep ratio relative to the initial capacity.

As may be seen from FIG. 8, the sample 16 of the non-aqueous electrolytic solution secondary cell, employing only $LiCoO_2$ for the positive electrode, the capacity is decreased precipitously, while the samples 11 to 16 of the non-aqueous electrolytic solution secondary cells maintained the capacity not less than 60% even after cycling five or more times. Since it is presumably only a rare occurrence that a cell mounted on a real equipment be over-discharged and kept at 0V for prolonged time, no practical inconvenience possibly is produced on the condition that the capacity of this order of magnitude is maintained.

In samples 17 to 22, cylindrically-shaped non-aqueous electrolytic solution secondary cells were prepared, using a mixture of the first lithium compound $LiFePO_4$ and the second lithium compound $LiNi_{0.8}Co_{0.2}O_2$ as a positive electrode active material, to check for cell characteristics.

Sample 17

A positive electrode was prepared in the same way as in sample 11, except using $LiNi_{0.8}Co_{0.2}O_2$ in place of $LiCoO_2$ as the second lithium compound, and mixing the first lithium compound $LiFePO_4$ and the second lithium compound $LiNi_{0.8}Co_{0.2}O_2$ at a weight ratio of 10:90 to form the positive electrode active material. A cylindrically-shaped non-aqueous electrolytic solution secondary cell was prepared using the so-prepared positive electrode.

Sample 18

A positive electrode was prepared in the same way as in sample 17, except changing the weight ratio of the first lithium compound $LiFePO_4$ and the second lithium compound $LiNi_{0.8}Co_{0.2}O_2$ to 20:80, in producing the positive electrode active material, and a cylindrically-shaped non-aqueous electrolytic solution secondary cell was prepared using this positive electrode.

Sample 19

A positive electrode was prepared in the same way as in sample 17, except changing the weight ratio of the first lithium compound $LiFePO_4$ and the second lithium compound $LiNi_{0.8}CO_{0.2}O_2$ to 30:70, in producing the positive electrode active material, and a cylindrically-shaped non-aqueous electrolytic solution secondary cell was prepared using this positive electrode.

Sample 20

A positive electrode was prepared in the same way as in sample 17, except changing the weight ratio of the first lithium compound $LiFePO_4$ and the second lithium compound $LiNi_{0.8}CO_{0.2}O_2$ to 40:60, in producing the positive electrode active material, and a cylindrically-shaped non-aqueous electrolytic solution secondary cell was prepared using this positive electrode.

Sample 21

A positive electrode was prepared in the same way as in sample 17, except changing the weight ratio of the first lithium compound $LiFePO_4$ and the second lithium compound $LiNi_{08}CO_{0.2}O_2$ to 50:50, in producing the positive electrode active material, and a cylindrically-shaped non-aqueous electrolytic solution secondary cell was prepared using this positive electrode.

Sample 22

A positive electrode was prepared in the same way as in sample 17except using only the second lithium compound $LiNi_{0.8}Co_{0.2}O_2$, in producing the positive electrode active material and, using this positive electrode, a cylindrically-shaped non-aqueous electrolyte cell was prepared.

Figure 9:
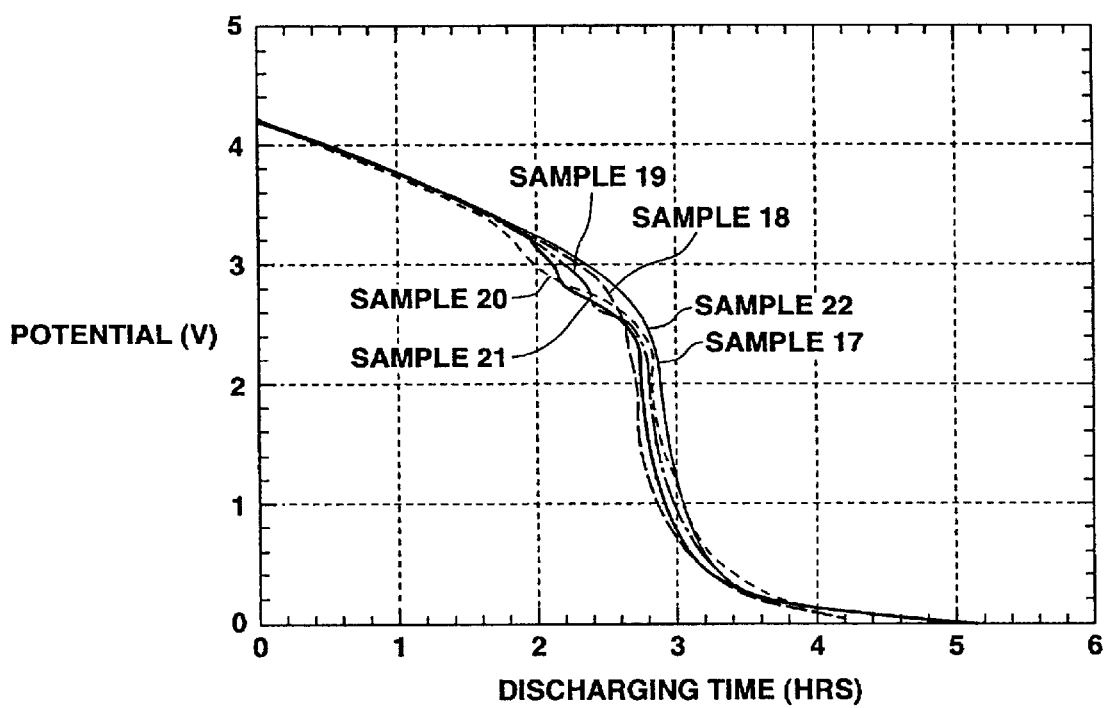
FIG. 9 shows discharging curves for cells of samples 17 to 22.

The samples 17 to 22 of the non-aqueous electrolytic solution secondary cells, prepared as described above, were charged to 4.1V, at the constant current of 200 mA, and subsequently discharged to 0V under a load of 7.5Ω. FIG. 9 shows a corresponding discharging curve.

It is seen from FIG. 9 that the sample 17 of the non-aqueous electrolytic solution secondary cell with the amount of addition of the first lithium compound $LiFePO_4$ equal to 10 wt % shows a discharging curve similar to one of the sample 22 of the non-aqueous electrolytic solution secondary cell employing only the second lithium compound $LiNi_{0.8}Co_{0.2}O_2$. However, if the amount of addition of the first lithium compound exceeds 20 wt %, a shoulder becomes noticeable towards the end of the discharging period. It is also seen that the cell voltage of each of the non-aqueous electrolytic solution secondary cells is substantially 0V in four hours thus demonstrating the over-discharging state.

The samples 17 to 22 of the non-aqueous electrolytic solution secondary cells were dismantled and checked. It was found that dissolution of the negative electrode current collector was observed in none of the samples 17 to 21 of the non-aqueous electrolytic solution secondary cells. On the other hand, part of the copper current collector was dissolved in the sample 22 of the non-aqueous electrolytic solution secondary cell employing only $LiNi_{0.8}Co_{0.2}O_2$ for the positive electrode, such that pits were formed in the copper current collector.

Figure 10:
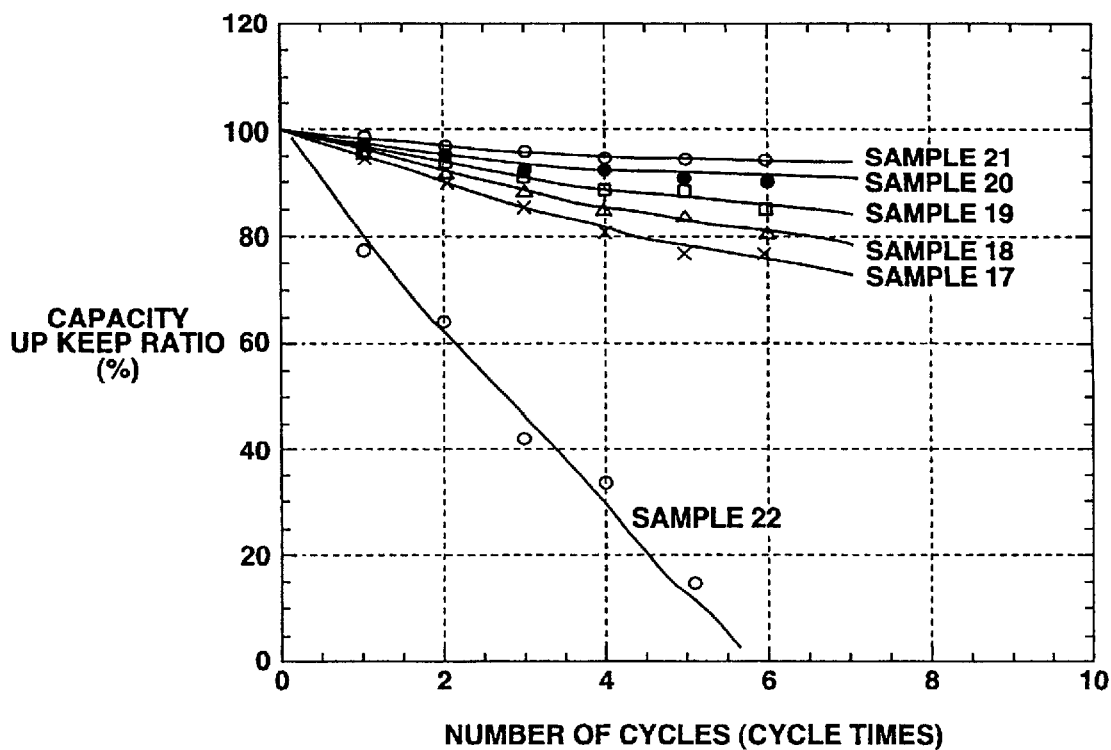
FIG. 10 shows the relation between the charging/discharging cycle and the volume upkeep ratio of cells of the samples 17 to 22.
Figure 11:
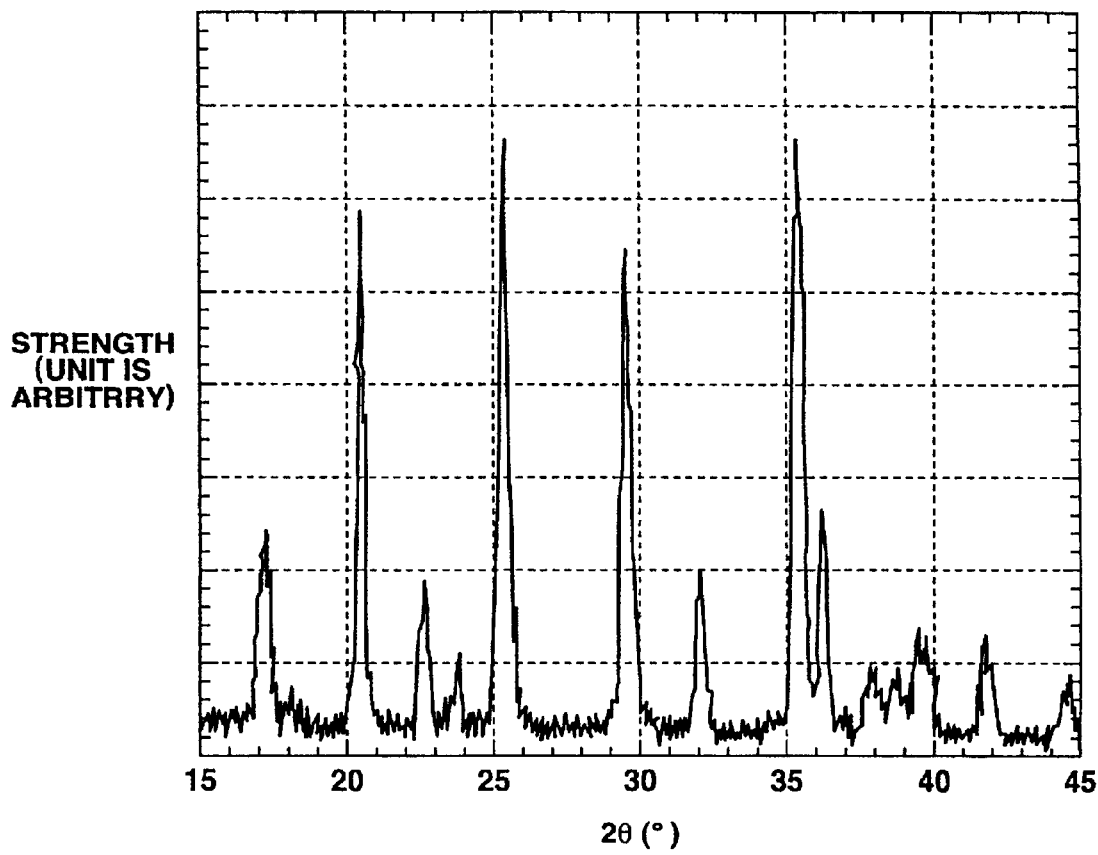
FIG. 11 shows an X-ray diffraction pattern of a first lithium compound $Li(Fe_{0.4}Mn_{0.6})PO_4$ as a first lithium compound synthesized in sample 23.

Moreover, the samples 17 to 22 of the non-aqueous electrolytic solution secondary cells were put to a cyclic test of charging the cells, and over-discharging the cells to 0V, under the same charging/discharging conditions as those of FIG. 9, and allowing the cells to stand for 24 hours, in a repetitive fashion. FIG. 10 shows the relation between the number of cycles and the discharge capacity upkeep ratio relative to the initial capacity.

As may be seen from FIG. 10, the sample 22 of the non-aqueous electrolytic solution secondary cell, employing only $LiNi_{0.8}Co_{0.2}O_2$ for the positive electrode, the capacity is decreased precipitously, while the samples 11 to 22 of the non-aqueous electrolytic solution secondary cells maintained the capacity not less than 70% even after cycling five or more times. Since it is presumably only a rare occurrence that a cell mounted on a real equipment be over-discharged and kept at 0V for prolonged time, no practical inconvenience possibly is produced on the condition that the capacity of this order of magnitude is maintained.

In samples 23 and 24, coin-shaped non-aqueous electrolytic solution secondary cells were prepared, using a mixture of the first lithium compound $Li(Fe_{0.4}Mn_{0.6})PO_4$ and the second lithium compound $LiNi_{0.8}Co_{0.2}O_2$ as a positive electrode active material, to check for cell characteristics.
Sample 23

$Li(Fe_{0.4}Mn_{0.6})PO_4$, as the first lithium compound, was synthesized as follows: Iron acetate $MgC_2O_4.2H_2O$, manganese carbonate $MnCO_3$ and ammonium phosphate $NH_4H_2PO_4$ and lithium carbonate $Li_2CO_3$ were mixed sufficiently. The resulting mixture was directly calcined in a nitrogen atmosphere at 300° C. for 12 hours, and fired at 600° C. for 24 hours in a nitrogen atmosphere. X-ray diffraction analyses of the produced powders revealed that the single-phase $Li(Fe_{0.4}Mn_{0.6})PO_4$ has been synthesized.

Then, $Li(Fe_{0.4}Mn_{0.6})PO_4$ produced and $LiNi_{0.8}Co_{0.2}O_2$ as the second lithium compound were mixed together at a weight ratio of 30:70 to give a mixture which then was used as a positive electrode active material.

Using the so-produced positive electrode active material, the positive electrode was prepared as now explained and, using the positive electrode, so prepared, a coin-type non-aqueous electrolytic solution secondary cell was prepared.
Sample 24

A positive electrode was prepared in the same way as in sample 23, except using only $Li(Fe_{0.4}Mn_{0.6})PO_4$, which is the first lithium compound as the positive electrode active material. Using this positive electrode, a coin-shaped non-aqueous electrolytic solution secondary cell was prepared.

The samples 23, 24 of the non-aqueous electrolytic solution secondary cells, prepared as described above, were put to a charging/discharging test.

The charging was conducted at constant current up to 4.2V, which voltage then was kept. The charging was terminated when the current fell to 0.01 $mA/cm^2$ or less. The discharging was carried out subsequently and terminated when the voltage fell to 2.0V. The charging and discharging were carried out at an ambient temperature of 23° C. For both charging and discharging, the current density was 0.12 $mA/cm^2$.

Figure 12:
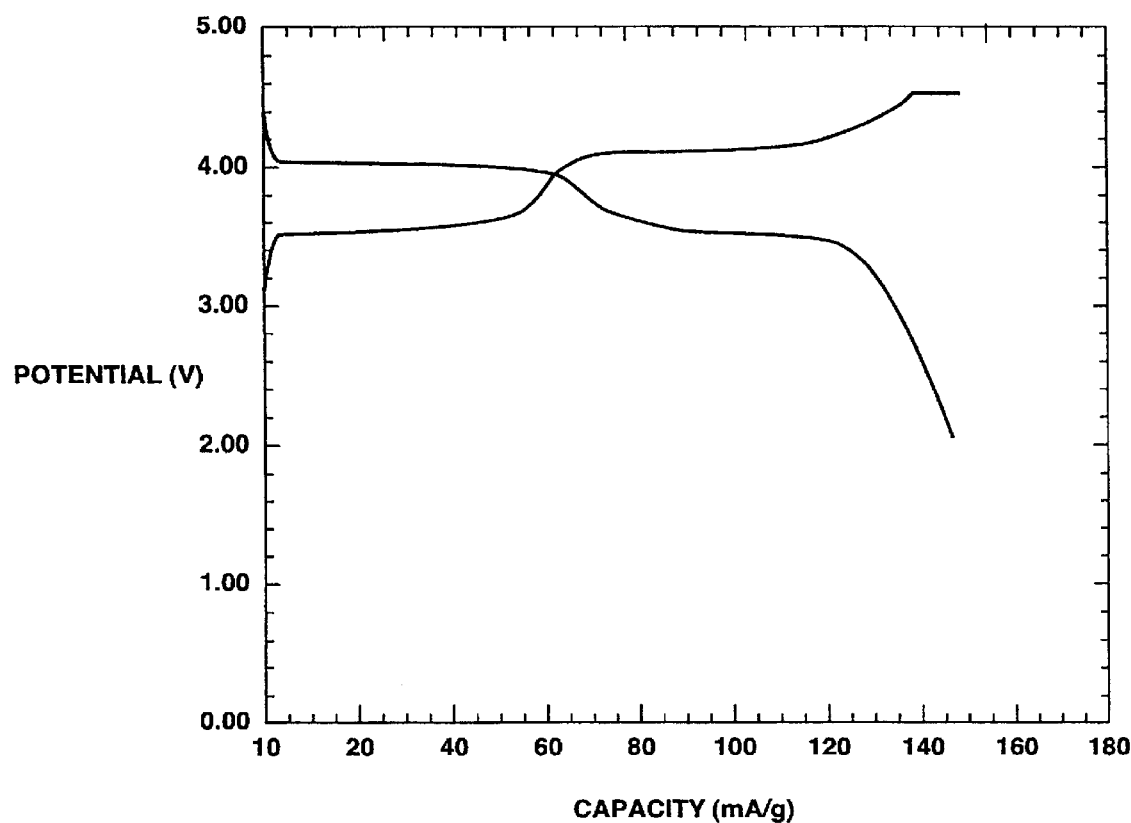
FIG. 12 shows a charging/discharging curve of a cell of sample 23.

FIG. 12 shows charging/discharging characteristics of the sample 24 of the coin-shaped non-aqueous electrolytic solution secondary cell employing only $Li(Fe_{0.4}Mn_{0.6})PO_4$. From FIG. 12 may be confirmed not only the capacity observed in the 3.4 V area as seen in $LiFePO_4$ but also the capacity in the vicinity of 4V.

Figure 13:
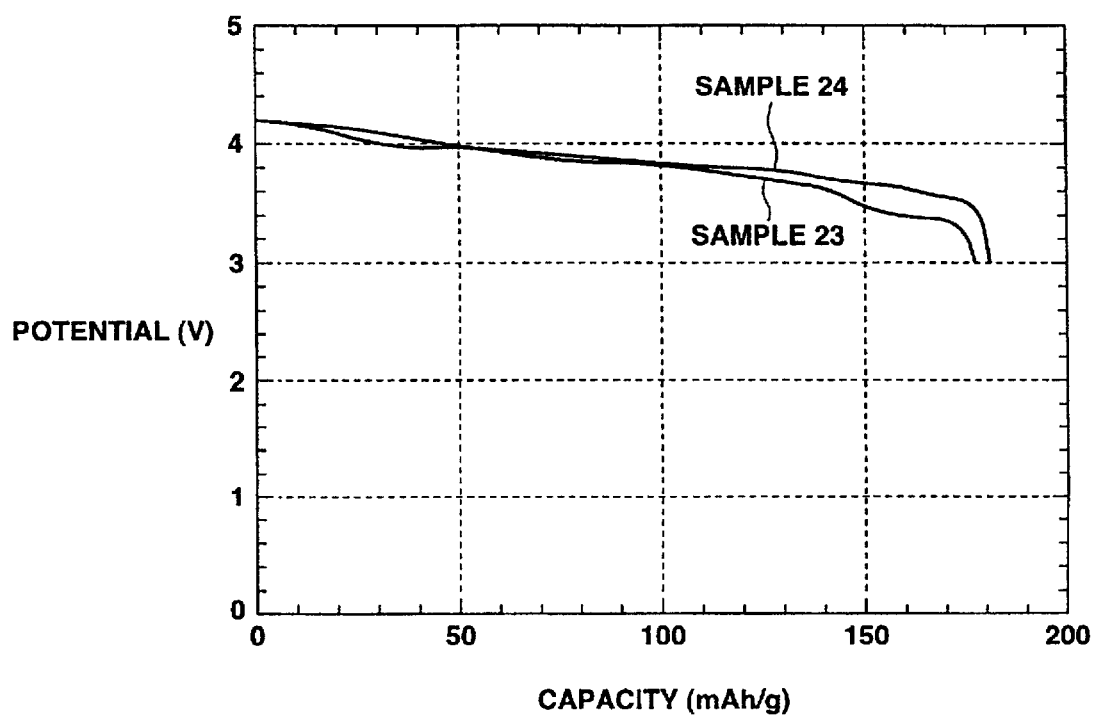
FIG. 13 shows charging/discharging curves of cells of samples 23 and 24.

FIG. 13 shows discharging characteristics of the samples 23, 24 of the coin-shaped non-aqueous electrolytic solution secondary cells. It is seen from FIG. 13 that $LiNi_{0.8}Co_{0.2}O_2$ is in operation in an area in the vicinity of 3.5 to 4.2V, while $Li(Fe_{0.4}Mn_{0.6})PO_4$ is in operation in the vicinity of 3.4 and 4.0V. Since the operating voltages of the two are close to each other, smooth charging/discharging characteristics may be achieved. In addition, since there is a 4V potential in $Li(Fe_{0.4}Mn_{0.6})PO_4$, the difference from the charging/discharging characteristics proper to $LiNi_{0.8}Co_{0.2}O_2$ by itself is suppressed to a smaller value.

Moreover, the samples 23, 24 of the coin-shaped non-aqueous electrolytic solution secondary cells were charged under the charging/discharging conditions similar to those of FIG. 12 and over-discharged to 0V. The cells were allowed to stand in this state for 24 hours. This cycle of operations was carried out repeatedly. It may be seen from this cyclic test that, by using the compound electrode with $Li(Fe_{0.4}Mn_{0.6})PO_4$, the cyclic characteristics are improved appreciably. It has also been confirmed that the non-aqueous electrolyte secondary cell of the sample 24 employing only $Li(Fe_{0.4}Mn_{0.6})PO_4$ as the positive electrode undergoes capacity deterioration precipitously, whereas, in the non-aqueous electrolyte secondary cell of sample 23 employing the compound electrode with $Li(Fe_{0.4}Mn_{0.6})PO_4$, the cyclic characteristics may be improved appreciably.

What is claim is:

1. A combination of a positive electrode and a negative electrode for a non-aqueous electrolyte cell, the combination of electrodes comprising:

a positive electrode wherein a layer of a positive electrode active material is formed on a positive electrode current collector, and wherein said layer of the positive electrode active material contains, as a positive electrode active material, a composite product of a first lithium compound represented by the general formula $Li_xM_yPO_4$, where $0<x<2$, $0.8<y<1.2$ and M contains Fe, and a second lithium compound having a potential nobler than the potential of said first lithium compound; and a negative electrode including a negative electrode current collector comprising copper.

2. The combination of electrodes according to claim 1 wherein said first lithium compound is $LiFePO_4$.

3. The combination of electrodes according to claim 1 wherein said first lithium compound is $LiFe_zMn_{1-z}PO_4$, where $0<z<1$.

4. A non-aqueous electrolyte cell comprising:

a positive electrode including a positive electrode current collector carrying a layer of a positive electrode active material thereon;

a negative electrode including a negative electrode active material carrying a layer of a negative electrode active material thereon and a negative electrode current collector comprising copper; and a non-aqueous electrolyte interposed between said positive electrode and the negative electrode;

said layer of the positive electrode active material contains, as a positive electrode active material, a composite product of a first lithium compound represented by the general formula $Li_xM_yPO_4$, where $0<x<2$, $0.8<y<1.2$ and M contains Fe, and a second lithium compound having a potential nobler than the potential of said first lithium compound.

5. The non-aqueous electrolyte cell according to claim 4 wherein said first lithium compound is $LiFePO_4$.

6. The non-aqueous electrolyte cell according to claim 4 wherein said first lithium compound is $LiFe_zMn_{1-z}PO_4$, where $0<z<1$.

7. The non-aqueous electrolyte cell according to claim 4 wherein a carbonaceous material or an alloy material is used.

8. The non-aqueous electrolyte cell according to claim 7 wherein said carbonaceous material includes one or more selected from the group consisting of pyrocarbons, cokes, graphites, vitreous carbon fibers, sintered organic high molecular compounds, carbon fibers and activated charcoal.

9. The non-aqueous electrolyte cell according to claim 8 wherein said cokes are one or more selected from the group consisting of pitch coke, needle coke and petroleum coke.

10. The non-aqueous electrolyte cell according to claim 8 wherein said sintered organic high molecular compounds are one or more selected from phenolic resin and furan resin sintered and carbonified at moderate temperatures.

11. The non-aqueous electrolyte cell according to claim 8 wherein said alloy material is a compound represented by the general formula $M_xM'_yLi_z$ where M is element Li and one or more metal element other than the element M, x is a number larger than 0 and y, z are numbers not less than 0.

12. The non-aqueous electrolyte cell according to claim 11 wherein one or more semiconductor element selected from among B, Si and As is contained as said metal element.

13. The non-aqueous electrolyte cell according to claim 7 wherein one or more selected from among Mg, B, Al, Ga, In, Si, Sn, Pb, Sb, Bi, Cd, Ag, Zn, Hf, Zr and Y is contained as said alloy material.

14. The non-aqueous electrolyte cell according to claim 11 wherein one or more selected from among Mg, B, Al, Ga, In, Si, Sn, Pb, Sb, Bi, Cd, Ag, Zn, Hf, Zr and Y is contained as said alloy compound.

15. The non-aqueous electrolyte cell according to claim 7 wherein one or more selected from among Li—Al, Li—Al—M, where M is one or more of 2A, 3B and 4B group transition metal elements, AlSb and CuMgSb.

16. The non-aqueous electrolyte cell according to claim 11 wherein group 3B typical elements are used as elements that can be alloyed with lithium.

17. The non-aqueous electrolyte cell according to claim 11 wherein the elements that can be alloyed with lithium are in the form of compounds represented by MxSi and MxMn, where M is one or more metal element excluding Si or Sn.

18. The non-aqueous electrolyte cell according to claim 11 wherein the elements that can be alloyed with lithium include one or more selected from the group consisting of $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

19. The non-aqueous electrolyte cell according to claim 11 wherein the elements that can be alloyed with lithium include one or more metal element and metal elements of the group 4B excluding carbon.

20. The non-aqueous electrolyte cell according to claim 11 wherein the elements that can be alloyed with lithium include one or more selected from the group consisting of SiC, $Si_3N_4$, $Si_2N_2O$, $Ge_2N_2O$, $SiO_x$, where $0<x\ 2$, $SnO_x$, where $021\ x\ 2$, LiSiO and LiSnO.

21. The non-aqueous electrolyte cell according to claim 4 wherein a solution obtained on dissolving an electrolyte in a non-protonic non-aqueous solvent is used as a non-aqueous electrolyte.

22. The non-aqueous electrolyte cell according to claim 21 wherein one or more selected from the group consisting of propylene carbonate, ethylene carbonate, butylene carbonate, vinylene carbonate, γ-butyl lactone, sulfolane, methyl sulfolane, 1,2-dimethoxyethane, 1,2-diethoxyethane, tetrahydrofuran, 2-methyl tetrahydrofuran, 1,3-dioxorane, 4-methyl 1,3-dioxorane, methyl propionate, methyl butyrate, dimethyl carbonate, diethyl carbonate, dipropyl carbonate, diethylether, acetonitrile, propionitrile, anisole, acetic acid esters, lactic acid esters, and propionic acid esters is contained as said non-aqueous solvent.

23. The non-aqueous electrolyte cell according to claim 21 wherein one or more selected from the group consisting of LiCl, LiBr, $LiPF_6$, $LiClO_4$, $LiAsF_6$, $LiBF_4$, $LiCH_3SO_3$, $LiCF_3SO_3$, $LiN(CF_3SO_2)_2$, $LiB(C_6H_5)_4$ is contained as an electrolyte dissolved in said non-aqueous solvent.

24. The non-aqueous electrolyte cell according to claim 4 wherein said separator is arranged between the positive and negative electrodes.

25. The non-aqueous electrolyte cell according to claim 24 wherein polypropylene is used as said separator.

26. The non-aqueous electrolyte cell according to claim 24 wherein said separator has a thickness not less than 50 μm.

* * * * *